United States Patent
Bhargava et al.

(10) Patent No.: US 10,496,265 B2
(45) Date of Patent: Dec. 3, 2019

(54) SLIDER MANIPULATION WITH PRECISION ALTERATION

(71) Applicant: Adobe Inc., San Jose, CA (US)

(72) Inventors: Animesh Bhargava, Uttam Nagar (IN); Christopher Philip Clevenger, San Francisco, CA (US); Anmol Dhawan, Noida (IN); Alok Pandey, Noida (IN)

(73) Assignee: Adobe Inc., San Jose, CA (US)

( * ) Notice: Subject to any disclaimer, the term of this patent is extended or adjusted under 35 U.S.C. 154(b) by 173 days.

(21) Appl. No.: 15/614,465

(22) Filed: Jun. 5, 2017

(65) Prior Publication Data
US 2018/0349005 A1 Dec. 6, 2018

(51) Int. Cl.
*G06F 3/0484* (2013.01)
*G06F 3/0488* (2013.01)

(52) U.S. Cl.
CPC ...... *G06F 3/04847* (2013.01); *G06F 3/04883* (2013.01); *Y10S 715/974* (2013.01)

(58) Field of Classification Search
CPC ............ Y10S 715/974; Y10S 715/973; Y10S 715/97; G06F 3/04847; G06F 3/04855; G06F 3/04883
See application file for complete search history.

(56) References Cited

U.S. PATENT DOCUMENTS

| 6,922,816 B1* | 7/2005 | Amin | G06F 3/04847 715/732 |
| 2014/0258854 A1* | 9/2014 | Li | G06F 3/0484 715/702 |

OTHER PUBLICATIONS

Appert et al., OrthoZoom Scroller: 1D Multi-Scale Navigation, Apr. 2006 (Year: 2006).*

* cited by examiner

*Primary Examiner* — Nicholas Ulrich
(74) *Attorney, Agent, or Firm* — SBMC

(57) ABSTRACT

Slider manipulation with precision alteration is described. In example implementations, a computing device increases a precision level of a slider to make selecting a specific value easier and more efficient. Initially, a user interface is displayed that includes a slider having a first precision level with a first granularity of values. The computing device detects a first user interaction that moves a marker indicative of a value along the slider. Based on a detection of a second user interaction, the computing device alters the slider to have a second precision level with a second granularity of values. Examples of second user interactions include a movement to some distance away from the slider or a change in speed of the movement. By making the second granularity lower than the first granularity, the slider having the second precision level is displayed with wider separation spaces between adjacent values.

20 Claims, 12 Drawing Sheets

SLIDER MANIPULATION WITH PRECISION ALTERATION

BACKGROUND

Computing devices, such as smart phones and tablet computers, have become an integral part of most people's lives. For example, people use smart phones not only for aural and textual communications, but also to obtain news and other information, to make sales and purchases, to keep up with friends and family, to find and navigate to destinations, and to enjoy a myriad of entertainment options. Furthermore, computing devices, even mobile ones, are still important productivity tools in the workplace. People rely on computing devices to create and edit documents, presentations, digital images, and other forms of media. These various capabilities are typically provided by different applications that are executed by a computing device.

The graphical user interface (GUI) was developed decades ago to simplify user interactions with an application executing on a computing device. Generally, a GUI represents computing concepts, capabilities, files, functions, and settings with icons, drag-and-drop motions, menus, and so forth. These GUI representations simplify computing tasks and make interacting with computing devices easier. An example of a user interaction mechanism that has been included as part of GUIs for years is a slider that has multiple values. A slider displayed as part of a GUI typically includes a slider bar and a marker. An end user drags the marker along the slider bar to change an indicated value for some parameter of a computing device. For example, a computing device adjusts a level at which sound is output responsive to where an end user moves a marker along a volume slider.

Sliders have been used effectively with the GUIs of desktop computing devices for years. Mobile computing devices, however, have taken an increasingly larger share of the computing device space over the last decade. Unfortunately, conventional approaches to implementing a slider in a GUI do not translate well to mobile computing devices due to constraints resulting from a reduced size of the display device. Consequently, adjusting a parameter with a slider is difficult for end users that are interacting with a mobile computing device.

SUMMARY

Slider manipulation with precision alteration is described. Techniques and systems described herein enable end users to set parameters using a slider at a fine precision level even with a mobile computing device, including those with smaller screens. To enable a fine precision level with a computing device having a smaller screen, a slider is displayed by the computing device at different precision levels. For example, as a finger of an end user nears a desired value along the slider, the computing device increases the displayed precision level of the slider such that a specific desired value can be selected with increased efficiency and certainty. To create a fine precision level for a slider, the computing device reduces a number of displayed values, e.g., while keeping a length of the slider constant. For instance, a number of values that are displayed along a slider can be decreased from 100 to 20. Consequently, the computing device can increase a width of the spaces separating adjacent values in the vicinity of a specific value that is desired by the user, which eases an ability of a user to select the specific desired value.

In one example, a computing device displays a user interface that includes a slider having multiple values. The user interface provides a dual-mode mechanism for user interaction. The two interaction modes include a slider adjustment mode and a slider alteration mode. In the slider adjustment mode, the slider is displayed at a first precision level. At this first precision level, a computing device displays values of the slider with a first separation space between adjacent values in the user interface. The computing device then detects a first user interaction along the slider during the slider adjustment mode. The first user interaction indicates a value, which is included as part of the values at the first precision level, as a marker is moved along the slider. For the slider alteration mode, the computing device detects a second user interaction that triggers a switch from the first precision level to a second precision level. At the second precision level, the computing device displays fewer values, but there is a wider separation space between adjacent values. The computing device can then return to the slider adjustment mode while values are displayed at the second precision level in order to support user selection of a particular value. With the wider separation spaces of the second precision level, the altered slider enables an end user to select an exact desired value with increased precision and efficiency.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference number in different instances in the description and the figures may indicate similar or identical items. Further, items represented in the figures may be indicative of one or more items, and thus reference may be made interchangeably to single or plural forms of the items in the description or in the drawings.

DETAILED DESCRIPTION

Overview

Figure 1:
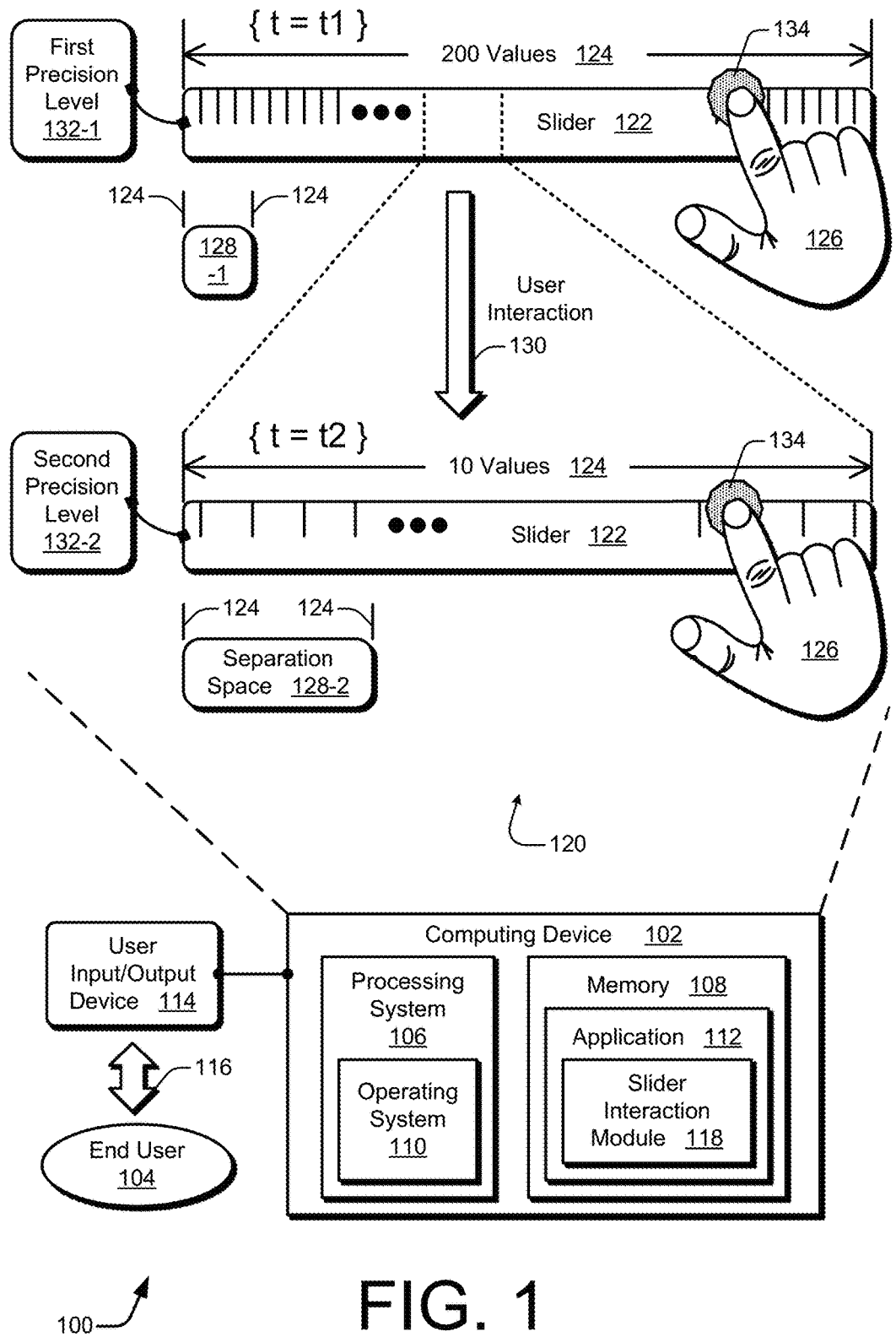
FIG. 1 illustrates an environment having a computing device for example implementations of slider manipulation with precision alteration.

A computing device displays a slider with a slider bar and a marker as part of a GUI. The GUI typically emulates the appearance and functionality of a physical slider scale mechanism. A slider is implemented as part of the GUI to enable an end user to adjust a functional parameter of the computing device. For example, a sound volume output by a computing device or an exposure level of a digital image can be adjustable using a slider displayed as part of a GUI. The slider bar includes multiple values that can be represented by, for instance, short vertical lines or dots. Movement of the marker along the slider bar changes a currently-indicated value based on which value the marker currently points to of the multiple values. When the marker remains stationary (e.g., over a threshold amount of time), the currently-indicated value is selected for the parameter.

Conventional approaches that implement a slider as part of a GUI, however, cause difficulties for end users, especially with smaller displays such as those of mobile computing devices, e.g., smart phones. These difficulties result from trying to select a specific value using a slider that has a reduced size due to size limitations of a displayed image of the mobile computing device. For an example conventional scenario, consider a slider that spans values from 0 to 100 and an end user that wishes to select the value 31. In operation, the end user quickly moves the marker along the slider to the vicinity of the desired value 31, say to the value 33, through interaction with the user interface. The end user may continue interaction with the user interface to refine this selection, such as to then move the marker to lower values. Lack of precision afforded by the display device of the mobile computing device, however, may result in selection of the value 28. Consequently, the user is then forced to continue interaction with the user interface in an attempt to "move the marker back up" to the desired value. As is readily apparent, this process may continue repeatedly and thus increase user frustration and even cause the user to forgo selection of the desired value.

The user faces this situation with conventional techniques because the default and only available precision level for a conventional slider is insufficient to enable an end user to adjust the marker at a fine precision, especially when confronted with a mobile computing device having a smaller display. For example, it is difficult to select a specific desired value when using a computing device having a reduced-size display while a slider is displayed with a high granularity of values. Thus, small sliders make it more difficult to precisely select a specific value. This issue is exacerbated if the choice between adjacent value increments has a high impact on a parameter of a given application, which makes precise selection critical. An example of a parameter in which precise selection can be critical is the exposure characteristic of a digital image.

Accordingly, techniques and systems are described in the following in which a computing device is configured to display and alter sliders to support various levels of precision. In operation, the computing device is configured to switch between a higher-displayed granularity with a lower precision level and a lower-displayed granularity with a higher precision level. With the higher precision level, an end user can select a specific value with greater certainty because fewer total values are displayed by the computing device across the slider at the lower granularity.

In one example, a digital image editing application displays a digital image in conjunction with a slider, i.e., as part of a user interface. The slider is representative of values for an image characteristic that are user selectable through interaction with the slider, such as an image contrast or exposure level. The computing device in this example supports a slider adjustment mode and a slider alteration mode. The computing device activates the slider adjustment mode in response to detection of a user input along the slider. For the slider adjustment mode, the computing device displays the slider at a first precision level, such as one that includes the full range of potential values for the corresponding image characteristic. The computing device may then detect an indicated value based on a user interaction of a movement of a marker along the slider. Although the full range of values may be available at the first precision level, the displayed high granularity makes accessing individual specific values difficult in practice. For example, the width of each specific value relative to the larger width of a finger makes it difficult for an end user to select a particular value.

The computing device therefore provides the slider alteration mode in addition to the slider adjustment mode. As part of the slider alteration mode, the computing device increases the space allocated to each individual displayed value so that an end user can touch or move a marker to a particular desired value. Different end user interactions can trigger activation of the slider alteration mode. An example user interaction includes a dragging of a finger beyond a slider adjustment zone that overlaps the slider. For instance, a finger can be dragged away from a displayed slider into at least one other zone that is some distance away from the slider adjustment zone to trigger the slider alteration mode. Another example of a triggering user interaction includes a change in the speed of finger movement along the slider (e.g., a slowing of the movement of the marker).

Responsive to a detection of one of these triggering interactions, the computing device alters the precision level of the slider. To do so, the computing device computes a range of values to be used for a display of the slider at a second precision level, e.g., based on an available display area of the display device. At the second precision level, a display range of the slider includes less than the full range of potential values for the corresponding parameter. For example, instead of providing 100 different values along a three-inch slider at the first precision level, the three-inch slider can provide 20 different values at the second precision level to accommodate a display size of the display device. Each individual displayed value therefore has five times more pixel space at the lower granularity. After the precision level of the slider is increased by lowering the granularity of the displayed values, the computing device returns to the slider adjustment mode. Thus, the computing device can then detect a selection of one of the values that remain displayed at the second precision level.

Generally, with a slider alteration mode, sliders can be displayed at higher precision levels. Implementing a slider alteration mode therefore makes selecting a particular value of a slider simpler and more efficient. Thus, a user interface (UI) and an overall user experience (UX) of an application become more accessible and more helpful for end users. By making the UI and the UX more pleasant for end users, the likelihood that the application will be adopted or used frequently increases dramatically. Thus, implementing the slider alteration mode can increase the adoption rate for individual features of the application and for the application as a whole.

In the following discussion, after some example terminology is set forth, an example environment is described that may employ the techniques described herein. Example implementations of systems, apparatuses, and techniques are then described, followed by a section explaining example procedural implementations. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, implementations presented herein. Some terms are further elucidated using one or more examples.

A "user interface" refers to one or more components or aspects of a presentation provided by a computing device for visual or aural consumption by an end user in conjunction with mechanisms to interact with the components or aspects. Examples include windows, icons, menus, touching or clicking, dragging and releasing, gestures, switches, and sliders. A computing device can display a user interface or a part thereof, such as a slider. A "display" refers to a visual portion of a user interface or other image presented by a computing device. An act of "displaying" refers to an operation that presents a visually-discernable portion of a user interface or other image for viewing by an end user.

A "slider" refers to a user interface mechanism having multiple values and enabling an end user to adjust a parameter of some object of a computing device. A slider can include a slider bar, a marker (e.g., an indicator marker), a minimum value, a maximum value, an indicated or selected value, and so forth. At least the locations of values can be visually represented along the slider, such as with lines or dots. A slider bar can be implemented as a rectangle, a rounded rectangle, an elongated oval, a curved shape such as an arc, and so forth, with the values realized along the slider bar. If a computing device detects that a user interaction is for a user input to move the marker along the slider, the computing device can continuously adjust the indicated value as the marker is moved until a value is selected by the cessation of movement.

A "value" refers to a numeral or another character or variable that a parameter can take. Each value can be realized as some physical space or one or more pixels along a displayed slider. Each value can therefore be assigned to a thin or thick line perpendicular to a direction in which a slider bar runs, to some width along the slider, and so forth. Each value, if individually or visually depicted, can be represented with a tick mark, a vertical line, a color gradation, a dot, a circle, and so forth. An "indicated value" refers to a value that is currently indicated by a marker of a slider while the marker is engaged by an end user or after the marker is disengaged to select a value. The indicated value or a selected value can be displayed as part of a user interface. A number of displayed values of a slider can determine a current precision level of the slider.

A "precision level" refers to how precisely a particular value can be selected along a slider. Higher precision levels have individual values that are easier to select. Generally, a number of displayed values varies inversely with a precision level of a slider. Thus, the greater the number of values represented by a slider of a given length, the lower the precision level of the slider at the given length. To increase the precision level of a slider, the number of displayed values can be reduced, and the width of separation spaces between adjacent values of the slider can be increased. A precision level can correspond to a granularity of displayed values.

A "granularity of displayed values" refers to how many values of a slider are currently displayed. The granularity is highest if all potential values are displayed. The granularity of the displayed values decreases as the number of displayed values decreases. Thus, a precision level of a slider increases as the granularity decreases. Similarly, a "density of values" refers to a number of values per unit along a slider. A density of values can be expressed in terms of a number of values per physical distance along a slider, a number of values per some number of displayed pixels, and so forth. Conversely, a density may be expressed as a number of pixels per value or a width per value. A density of values is decreased as fewer values are included per spatial unit or as more pixels are allocated to each individual value. Thus, a precision level of a slider can be increased by lowering a granularity of displayed values or by lowering the density of the displayed values.

An "alteration" refers to a change or switching of a slider from one precision level to another precision level. A computing device can perform an alteration responsive to user interaction indicative of a user input to increase or decrease a precision level. A precision level can correspond to a granularity of displayed values of a slider, a density of displayed values of a slider, a display range of a slider, and so forth.

A "display range of a slider" refers to the number of values represented by a currently-displayed slider. The display range may vary from the full potential of multiple values possible for a given parameter down to a number of values corresponding to a highest precision level. The current display range of a slider is determinable based on a difference between a maximum value and a minimum value of a slider at a currently-displayed precision level.

A "parameter" refers to some characteristic of an object. An object can be or can represent a user discernable item or thing such as a digital image or a sound volume. Alternatively, an object can be or can represent an item or thing that is not directly discernable by an end user, such as an amount of memory allocable to a task or a compression level for a media file. Thus, a parameter represents some aspect of an object, such as a percentage, ratio, or level of a media characteristic. For a digital image type of object, example parameters include exposure, contrast, sharpness, and color.

A "set of values" or "subset of multiple values" refers to a group of values forming some percentage of the complete possible collection of values for a given parameter. Thus, in accordance with the meaning of the term "subset," the group can include a number of values that is fewer than the complete possible collection or a number of values that encompasses the entirety of the complete possible collection. Subsets of values for a slider become smaller in number as a precision level increases for the slider.

A "user interaction" refers to a detected user input that impacts a user interface of a computing device. Examples include changes to location of input on a display, movements, drags, gestures, etc. that affect a user interface component, such as an icon, a menu item, a switch, a slider or marker thereof, a cursor or pointer, and so forth. The computing device can detect the user input with a touch screen, an accelerometer, a touch pad, a mouse, a gyroscope, a camera, and so forth.

A "user input" refers to a user's interaction that is interpretable by a computing device as a computing command in accordance with some defined user interface. Computing commands include open a file, select a digital image, select a menu item, move a marker of a slider, adjust a value of a parameter, drag an object, alter a precision level of a slider, activate a mode—such as a slider adjustment mode or a slider alteration mode, launch a program, start a movie, change a time index of video or other media, and so forth. A user input can be detected via an interaction implement.

An "interaction implement" refers to a physical object usable by an end user to interact with a user interface. Examples of interaction implements include a finger, a hand, an electronic pencil, a mouse, an eye, a glove, a game controller, and a touch pad. A computing device is capable of detecting an engagement with a user interface or a movement made by an interaction implement. A "movement of an interaction implement" includes a movement to engage a user interface, such as the touch of a display screen; a sliding movement in one dimension, such as left and right; a dragging movement in two dimensions, such as up/down/left/right/diagonally; and so forth. An engagement with a user interface occurs if a computing device detects that an interaction implement is attempting to control some aspect of a user interface, including an attempt to activate some mode or extend the existence of some interaction between the user interface and the interaction implement. A "detection" or an act of "detecting" a user interaction refers to a computing device performing some operation that recognizes user interaction at the hardware, basic input/output system (BIOS), operating system (OS), application, etc. level. For example, hardware can notify an application via the operating system that a hand is positioned in space at a point at which a user interface feature appears to be projected from the perspective of an end user as part of an augmented reality display.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations of slider manipulation with precision alteration using a slider interaction module 118. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the slider interaction module 118. Example implementations for the computing device 102 and the slider interaction module 118 are described further below in this section. The example environment of FIG. 1 further depicts an end user 104 and a user interaction between the end user 104 and the user I/O device 114 that produces a user control signal 116. The environment further includes a user interface 120 displaying a slider 122.

As shown, the user interface 120 includes the slider 122 at one moment (e.g., at a first time $\{t=t1\}$ or "t1") and the slider 122 at another moment (e.g., at a second time $\{t=t2\}$ or "t2"). The second time occurs after some elapsed period and in response to one or more user interactions 130. As described herein, the slider 122 at the second time represents an altered version of the slider 122 at the first time. The operating system 110 or the application 112 includes or generates the user interface 120. The computing device 102 provides the user interface 120 to present output to the end user 104 or to accept input from the end user 104 via the user I/O device 114 and the user control signal 116. The user interface 120 can be presented via a display device. Examples of display devices include a display screen, such as a glass-covered light-emitting diode (LED) display screen; a video projector; a virtual or augmented reality imaging display, such as a virtual reality (VR) headset or augmented reality (AR) glasses; some combination thereof; and so forth.

The application 112 can be realized as any computer program that is responsive to some form of user input that is detected as a user interaction 130. The user interaction 130 can occur using a finger, stylus, hand, eye movement, and so forth, and the user interaction 130 can be detected using a touchscreen, motion controlled device (e.g., an accelerometer or gyroscopic sensor), trackpad, camera, and so forth. The operating system 110 or the application 112 detects the user control signal 116 that is interpreted as a user interaction 130, and the user interaction 130 is then processed as a user input. A user interaction 130 can include a glide of a finger across a display device, a flick of a hand through a projected image, a touch of a finger on a track pad, and so forth.

In example implementations, the slider interaction module 118 alters a precision level 132 of the slider 122 based on user interaction. As shown in the context of the user interface 120, the end user 104 moves an interaction implement 126, such as a finger or a hand, to interact with the slider 122. The slider 122 represents a parameter that is adjustable by the end user 104. Examples for the parameter include a volume level of sound output, a time index of a movie or other media, a contrast level of a digital image, and so forth. The slider 122 includes a number of values 124 and a marker 134 that points to an indicated one of the values 124.

Responsive to detected user interaction, the slider interaction module 118 is configured to alter a precision level of the slider 122, e.g., a displayed granularity of the slider 122 can be reduced between a first time and a second time. In the illustrated example, the slider 122 at the first time "t1" includes a first set of displayed values 124, and the slider 122 at the second time "t2" includes a second set of displayed values 124 that is smaller than the first set. As shown by way of example, the first set has 200 values, and the second set has 10. Thus, the slider 122 has two hundred values 124 at the first time "t1," and the slider 122 has ten values 124 at the second time "t2." Accordingly, the slider 122 at the first time has a first precision level 132-1, and the slider 122 at the second time has a second precision level 132-2.

In an example scenario, at the first time "t1," the end user 104 experiences difficulty attempting to select an exact desired value 124 because the values are closely spaced together. For instance, if the end user 104 attempts to move the marker 134 back and forth over as small a distance as is possible, a currently-indicated value skips over multiple values (e.g., from 107 to 122) along the slider 122. This skipping between two different values occurs because the first separation space 128-1 between adjacent values 124 for the slider 122 at the first time "t1" is relatively smaller or more narrow than the second separation space 128-2 between adjacent values 124 for the slider 122 at the second time "t2."

In operation, the slider interaction module 118 detects a second user interaction that differs from the first user interaction, where the first user interaction involves the marker 134 sliding along the slider 122. For example, the slider interaction module 118 can detect that a location of the second user interaction is some distance beyond the first slider 122 (e.g., a finger of the hand has been moved above the top of the slider 122). Alternatively, the slider interaction module 118 can detect that a speed of movement of the second user interaction has changed (e.g., the speed of movement has dropped below some speed threshold). Responsive to a detection of the second user interaction, the slider interaction module 118 alters the precision level 132 of the slider 122 at the second time "t2." Thus, the slider 122 at the second time "t2" is displayed at the second precision level 132-2. The precision of the second precision level 132-2 is relatively greater than that of the first precision level 132-1 because the granularity of the displayed values 124 has been decreased. Consequently, the end user 104 can more easily adjust the marker 134 to an exact, desired value 124 because the physical separation space 128-2 between adjacent values 124 of the second precision level 132-2 is relatively wider than the separation space 128-1 for the first precision level 132-1.

Regarding the system 100, the computing device 102 can be implemented as any suitable type of computing device. Examples of end-user implementations for the computing device 102 include a desktop computer, a laptop or notebook computer, a mobile device with an integrated display screen (e.g., assuming a handheld configuration such as a tablet, a phablet, or a mobile phone), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a standalone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 12. The processing system 106 is representative of functionality to perform operations through execution of instructions stored in the memory 108. Although illustrated as two separate components, functionality of the processing system 106 and the memory 108 may be combined into one component (e.g., on an application specific integrated circuit (ASIC) or during operation as instructions are loaded from the memory onto a processor) or may be further divided into a greater number of components. Examples of a user I/O device 114 include a keyboard, a mouse, a touchpad, a touch screen, a microphone, a camera, an optical or accelerometer-based motion sensor, a display device such as a screen or projector, a speaker, or some combination thereof. The user I/O device 114 may be separate from or integrated with the computing device 102. The computing device 102 is further illustrated as including an operating system 110. The operating system 110 is programmed to abstract underlying hardware functionality of the computing device 102 to the application 112 that is executable on the computing device 102.

In example implementations, the slider interaction module 118 is resident at or executing on the computing device 102, such as by being part of the application 112 (as shown) or the operating system 110. The slider interaction module 118 represents functionality to implement schemes and techniques for slider manipulation with precision alteration as described herein. The slider interaction module 118 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. As described herein with reference to FIG. 12, the slider interaction module 118 may be fully or partially implemented as a feature of a web- or cloud-based service.

Systems and Techniques

Figure 2:
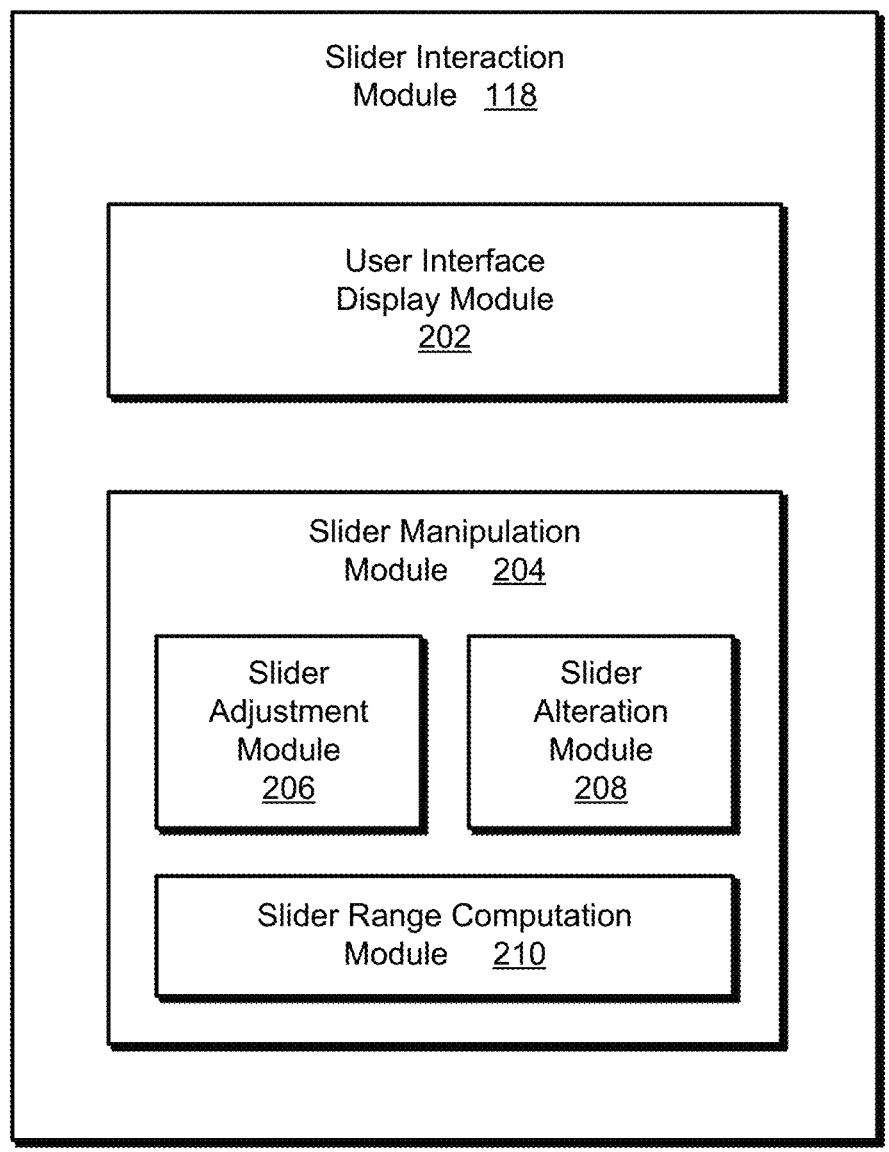
FIG. 2 depicts an example of a slider interaction module that alters a precision level of a slider responsive to user interaction.

FIG. 2 depicts an example of a slider interaction module 118 that alters a precision level 132 of a slider 122 responsive to user interaction. As shown, the slider interaction module 118 includes two modules: a user interface display module 202 and a slider manipulation module 204. The slider manipulation module 204 includes a slider adjustment module 206, a slider alteration module 208, and a slider range computation module 210. However, the slider interaction module 118 can alternatively include more, fewer, or different modules.

In example implementations, the user interface display module 202 displays a user interface 120 including a slider 122 having a first precision level 132-1 with a first granularity of values 124 at a first time. The slider adjustment module 206 detects a first user interaction along the slider 122, with the first user interaction changing an indicated value 124 as the marker 134 is moved. The slider alteration module 208 detects a second user interaction. The slider alteration module 208 alters the slider 122 to have a second precision level 132-2 with a second granularity of values 124 based on the detected second user interaction.

The slider range computation module 210 computes an updated range of values 124 for the slider 122 having the second precision level 132-2. For example, an updated minimum value and an updated maximum value for the ends of the slider 122 can be computed. The user interface display module 202 further displays the user interface 120 including the slider 122 having the second precision level 132-2 with the second granularity of values 124 at a second time. The second granularity is relatively lower than the first granularity. Thus, there are wider physical separation spaces 128-2 between adjacent values 124 for the second precision level 132-2 as compared to the separation spaces 128-1 of the first precision level 132-1.

An example of a user interface 120 that is displayed by the user interface display module 202 is described below with reference to FIG. 3. Example general schemes for implementing the functionality of the group of modules 202-210 are described with reference to FIG. 4. The slider adjustment module 206 is described with reference to FIG. 5, and the slider alteration module 208 is described with reference to FIGS. 6-8. Example approaches for realizing the slider range computation module 210 are described with reference to FIG. 9, which depicts a flow chart.

Any one or more of the five modules 202-210 of the slider interaction module 118 can be resident at or executing on an end-user computing device 102 (as depicted in FIG. 1), on a server of a data center as part of cloud computing functionality (e.g., on at least one server computing device), or partially on a cloud computing device and partially on a client-side computing device to jointly implement described functionality. Also, any one or more of the five modules 202-210 of the slider interaction module 118 can be a stand-alone module, part of the application 112 (of FIG. 1), part of the operating system 110, some combination thereof, and so forth.

Figure 3:
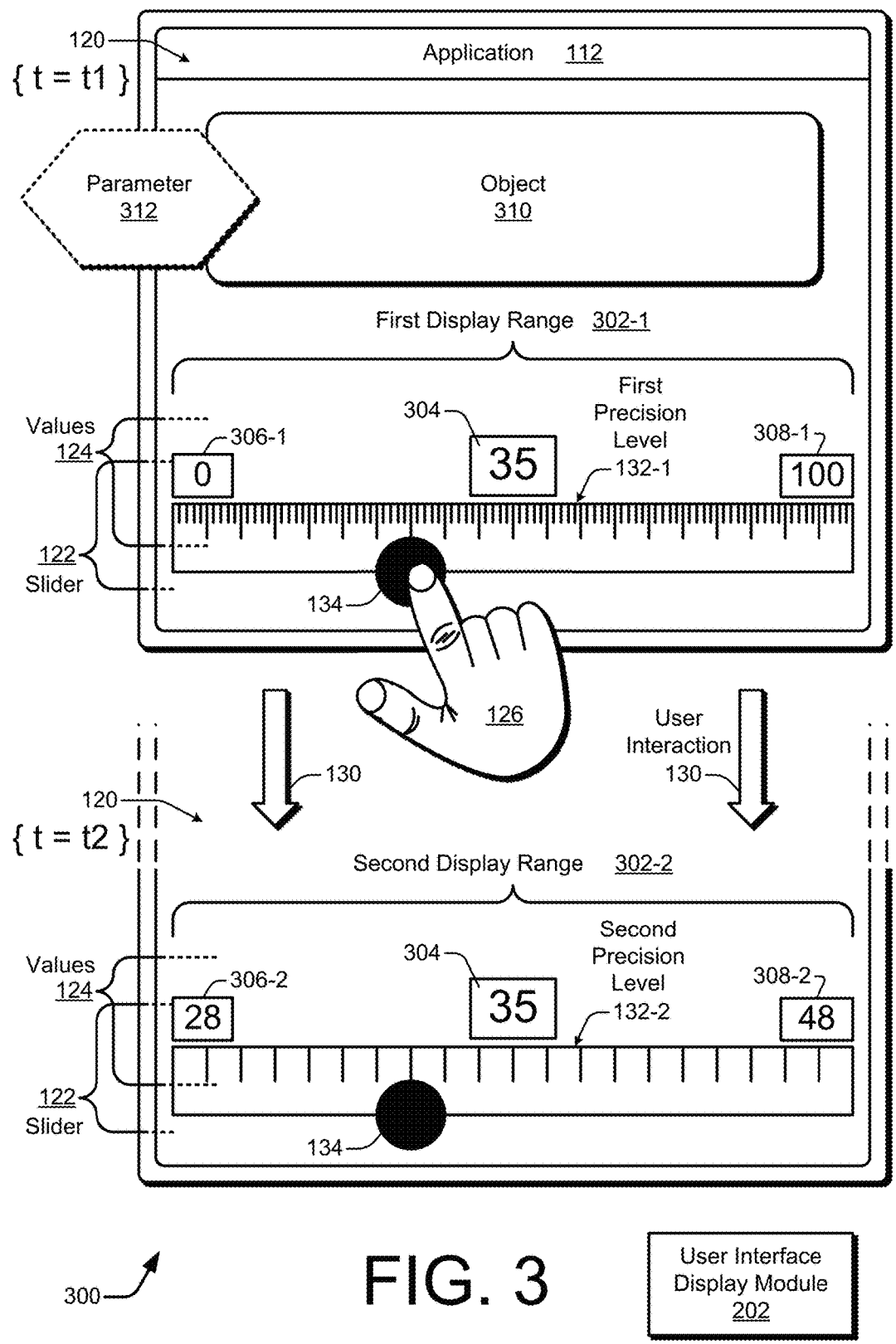
FIG. 3 illustrates an example of a user interface including a slider that is displayed by a user interface display module so as to include minimum and maximum values, with the slider having a first precision level or a second precision level.

FIG. 3 illustrates generally at 300 an example of a user interface 120 including a slider 122 that is displayed by a user interface display module 202, with the slider 122 having different precision levels 132 at different moments. The slider 122 is also displayed with minimum and maximum values. As illustrated in the upper portion of FIG. 3 for the first time "t1," the user interface 120 includes a window or frame for the application 112. Within the window, the user interface display module 202 displays the slider 122 including the values 124. The slider 122 at the first time "t1" has a first precision level 132-1 with a first display range 302-1. The first display range 302-1 extends from a first minimum value 306-1 to a first maximum value 308-1. The user interface display module 202 also displays an indicated or selected value 304 that is indicated by the marker 134 as the marker 134 is being moved.

In the lower portion of FIG. 3, the user interface 120 is illustrated for the application 112 at the second time "t2." The slider 122 at the second time "t2" has a second precision level 132-2 with a second display range 302-2. The second display range 302-2 extends from a second minimum value 306-2 to a second maximum value 308-2. The user interface display module 202 also displays the selected value 304 that is indicated by the marker 134 when the end-user stops moving the marker 134. As used herein, unless context dictates otherwise, precision levels 132, display ranges 302, separation spaces 128, minimum values 306, maximum values 308, and so forth may be referred to in terms of first or second to represent different versions of a same component at different moments (e.g., at a first time "t1" and a second time "t2," respectively).

In example implementations, the multiple values 124 pertain to at least one parameter 312 of an object 310. The object 310 can be or can represent a user-discernable item or thing such as a digital image, a sound volume, or a time index of a video. Alternatively, the object 310 can be or can represent an item or thing that is not directly discernable by an end user, such as an amount of memory allocable to a computing task or a compression level for a media file. The parameter 312 represents some aspect of the object 310 in terms of a percentage, a level of a characteristic, a setting of an attribute, and so forth. For a digital image type of object 310, example parameters 312 include exposure, contrast, sharpness, color, and so forth. The object 310 may be displayed proximate to the slider 122.

For an example scenario at the first time "t1," the first minimum value 306-1 has a "0" value, and the first maximum value 308-1 has a "100" value. The marker 134 is slid leftward along the slider 122 to adjust the position of the marker 134 until the indicated value 304 reads "35." The user interaction 130 then changes. Examples of changes to a user interaction include a change in distance from the slider 122 or a change in speed of movement of the user input. Responsive to the change in the user interaction 130, an alteration of the slider 122 is triggered. The precision level 132 is increased from the first precision level 132-1 to the second precision level 132-2 as the first display range 302-1 is decreased to the second display range 302-2.

As shown, the granularity of the displayed values 124 decreases as the first display range 302-1 is decreased to the second display range 302-2. For the second display range 302-2, the second minimum value 306-2 has an updated "28" value, and the second maximum value 308-2 has an updated "48" value. After the alteration from the first display range 302-1 to the second display range 302-2 at the second time "t2," the indicated value 304 continues to read "35." Maintaining the same indicated value 304 through the slider alteration process enables an end user to seamlessly continue sliding toward a desired value after the display range 302 of the slider 122 is updated.

Generally, a size of the first display range 302-1 is based on a difference between the first maximum value 308-1 and the first minimum value 306-1. The second display range 302-2 is based on a difference between the second maximum value 308-2 and the second minimum value 306-2. Example approaches for computing minimum and maximum values 306 and 308 are described with reference to FIG. 9. Here, because the precision level 132 is increased and the granularity of the values 124 is decreased from the first time "t1" to the second time "t2," the second display range 302-2 is smaller than the first display range 302-1. The first display range of 0-to-100 or 100 units (e.g., 100 minus 0) at the first time "t1" and the second display range of 28-to-48 or 20 units (e.g., 48 minus 28) at the second time "t2" are illustrated as examples. Other display ranges 302 may be presented to an end user, including those with negative or fractional minimum or maximum values.

Figure 4:
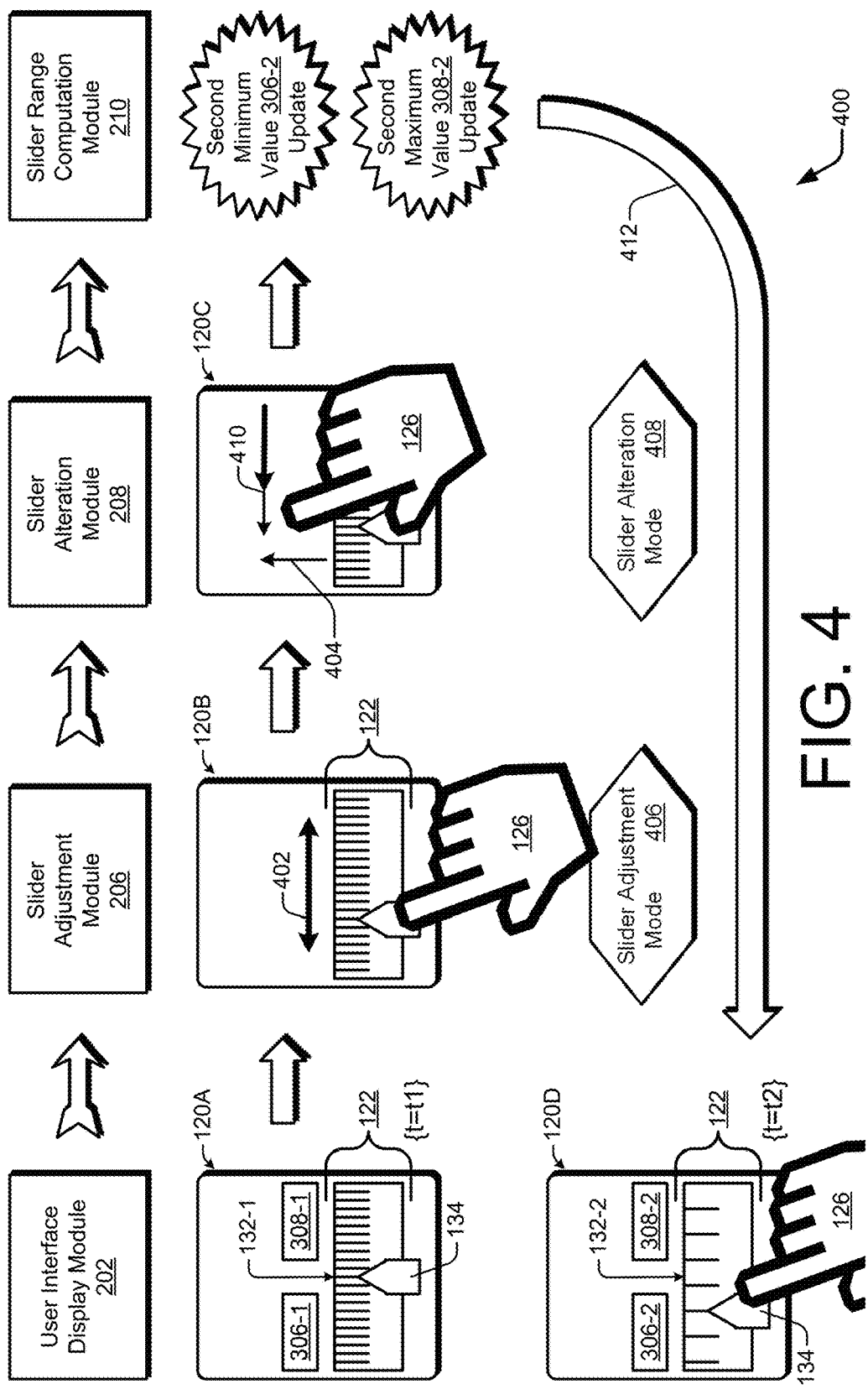
FIG. 4 illustrates an example scheme for slider manipulation with precision alteration by providing a user interface that enables an alteration of a slider precision level, as well as an adjustment of a selected slider value.

FIG. 4 illustrates an example scheme 400 for slider manipulation with precision alteration. A user interface is provided that enables a slider precision level to be altered as well as a slider value to be adjusted. Illustrated operations proceed from left to right in the top half of the figure. Starting from the left of FIG. 4, the user interface display module 202 displays a user interface 120A including a slider 122 at a first time "t1" with a first precision level 132-1 having a first granularity for the displayed values 124. The slider 122 includes a marker 134 and is associated with a first minimum value 306-1 and a first maximum value 308-1.

Moving rightward, the slider adjustment module 206 institutes a slider adjustment mode 406 for the user interface 120B. In the slider adjustment mode 406, the slide adjustment module 206 detects a first user interaction in the form of movement 402 of the interaction implement 126 (e.g., a finger) along the slider 122. The movement 402 can include, for example, left-right movement for a horizontal slider or up-down movement for a vertical slider. In some implementations, the interaction implement 126 remains engaged with the user interface 120 during the slider adjustment mode 406 and at least until a second user interaction is detected that triggers a slider alteration mode 408. For instance, a finger can implement a continuous touch of a physical display screen (e.g., without removing the finger from the glass of the screen) or a hand can continuously move through a projected augmented reality image to produce a continuous engagement.

During a continuous engagement with the user interface 120, the slider alteration module 208 institutes the slider alteration mode 408 responsive to detection of the second user interaction as shown for the user interface 120C. Examples of second user interactions that can serve as a trigger for the slider alteration mode 408 include changes to a distance 404 or changes to a speed 410 of the continuous user interaction. In some implementations, if the slider alteration module 208 detects that the user interaction moves some distance 404 beyond the slider 122, the slider alteration mode 408 is triggered. Example approaches for distance-based triggering of a slider alteration mode 408 are described with reference to FIGS. 6 and 7. In other implementations, if the slider alteration module 208 detects that the speed 410 of the user interaction has changed sufficiently, the slider alteration mode 408 is triggered. Example approaches for speed-based triggering of a slider alteration mode 408 are described with reference to FIG. 8.

Upon detection of a trigger, the slider 122 is updated to a different precision level 132. To do so, the slider range computation module 210 computes a different display range 302 (of FIG. 3), or a different granularity of values 124. For example, the slider range computation module 210 can compute updated values for the second minimum value 306-2 and the second maximum value 308-2. Example approaches for these computations are described with reference to FIG. 9. As indicated by arrow 412, the scheme 400 continues with the user interface display module 202 displaying an updated user interface 120D based on the updated display range with the second minimum value 306-2 and the second maximum value 308-2. As shown, the user interface display module 202 presents the slider 122 at a second time "t2" with a second precision level 132-2 having a second granularity of values 124. With the updated user interface 120D, the values 124 are spaced farther apart or are individually wider on the display as compared to the first precision level 132-1.

Figure 5:
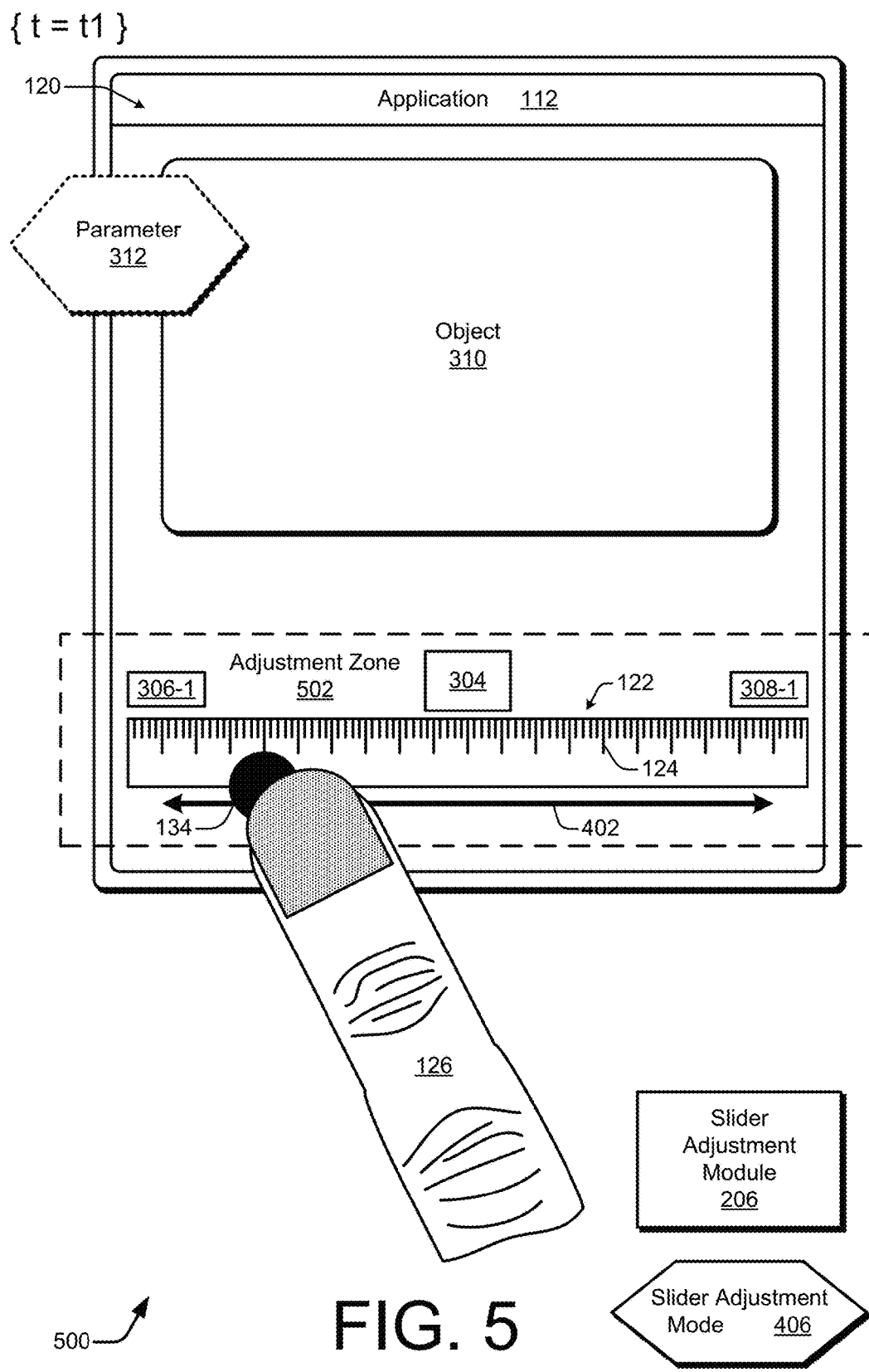
FIG. 5 illustrates an example user interface in which a slider adjustment module establishes an adjustment zone to enable slider value adjustments responsive to user interaction.

FIG. 5 illustrates generally at 500 an example of a user interface 120 at a first time "t1" in which the slider adjustment module 206 establishes an adjustment zone 502 with respect to a slider 122. The slider 122 includes multiple values 124, a marker 134, an indicated value 304, a first minimum value 306-1, and a first maximum value 308-1. The adjustment zone 502, which is shown with dashed lines, enables slider value adjustments responsive to a first user interaction, including a movement 402 along the slider 122. In an example operation, the slider adjustment module 206 establishes the adjustment zone 502 as part of instituting the slider adjustment mode 406. The adjustment zone 502 at least partially overlaps the slider 122; in other words, the adjustment zone 502 covers at least a portion of the slider 122. The slider adjustment module 206 detects movement 402 of the user input over the adjustment zone 502. As shown, the movement 402 is detected back and forth (e.g., in a left or right direction) along the slider 122. Based on the detected movement 402, the slider adjustment module 206 changes a number of the indicated value 304 as the marker 134 moves along the slider 122.

The slider 122 can be implemented in alternative forms. For example, any one or more of the indicated value 304, the minimum value 306, or the maximum value 308 may be omitted or placed in a different location. For instance, the minimum value 306 and the maximum value 308 can be displayed to the left and right of the endpoints (e.g., instead of above the endpoints) of the slider bar. As another example, the marker 134 can be shaped differently than the depicted circle, can be placed at a different position with respect to the displayed values (e.g., higher or lower), can be omitted, and so forth. For instance, the marker 134 can be realized by highlighting or changing a color of one or more values 124. As a further example, the values 124 can be presented differently, or individual indications can be omitted from the display of the user interface 120. For instance, the highest granularity of displayed values 124 can be represented with solid coloration or shading that lacks individually-discernable indicators of the values 124. Also, instead of line segments, the values 124 can be represented explicitly with dots or circles or implicitly using some span of pixels of the display.

Figure 6:
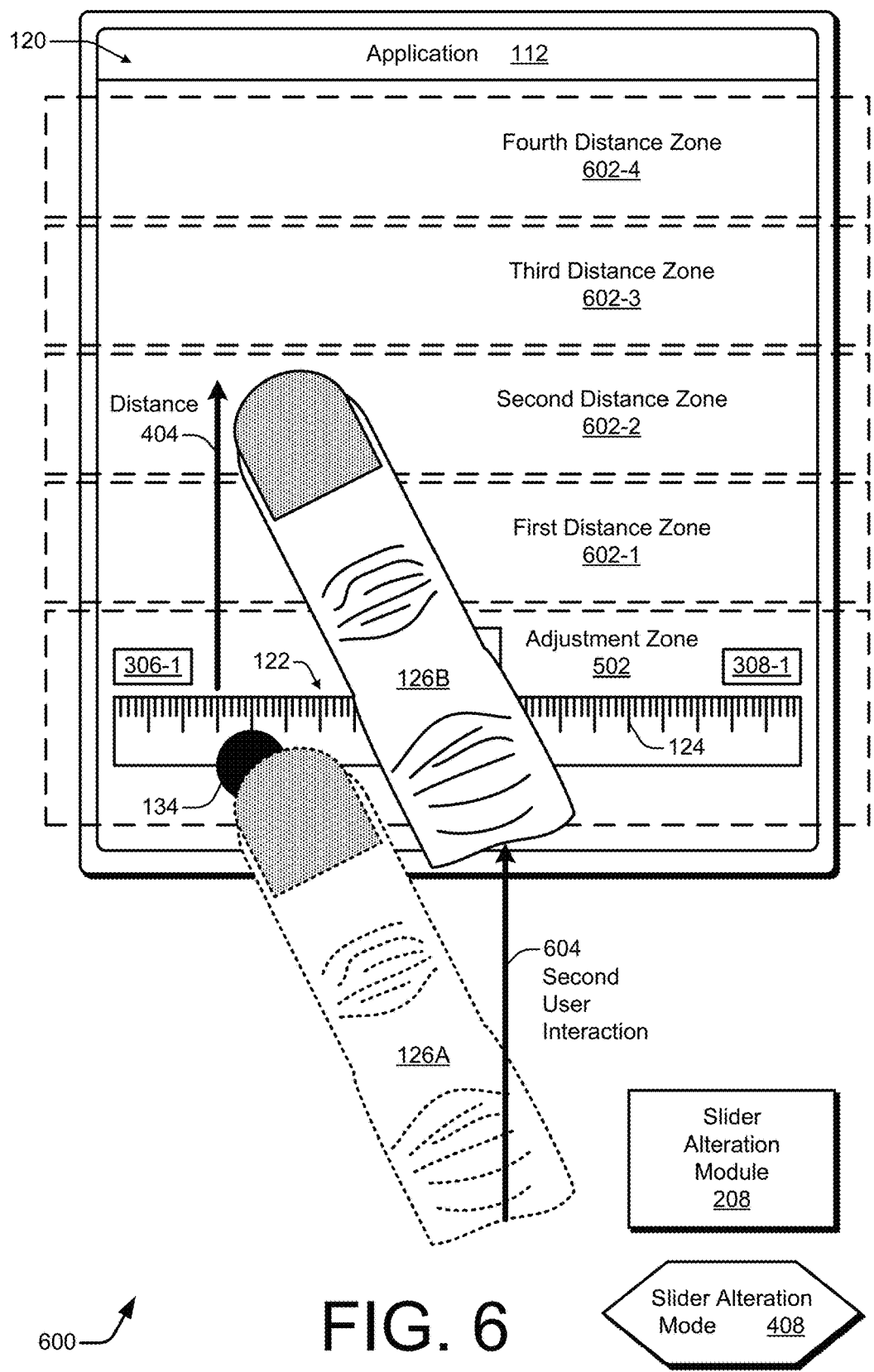
FIG. 6 illustrates an example user interface in which a slider alteration module alters a precision level of a slider based on a distance of a user interaction from the slider.

FIG. 6 illustrates generally at 600 an example of the user interface 120 in which the slider alteration module 208 alters a precision level of the slider 122 based on a second user interaction 604. Here, the second user interaction 604 includes a distance 404 from the slider 122 to a current location of the user input, such as a contact location of the interaction implement 126. In addition to the adjustment zone 502, multiple distance zones 602 are illustrated using dashed lines. In an example operation, the slider alteration module 208 establishes one or more distance zones 602 as part of the slider alteration mode 408. As shown, the slider alteration module 208 establishes four distance zones: a first distance zone 602-1, a second distance zone 602-2, a third distance zone 602-3, and a fourth distance zone 602-4. However, a different number of distance zones, such as one, two, or five, may be established instead. Each distance zone 602-1 to 602-4 is increasingly farther from the slider 122 or the adjustment zone 502 thereof. Each respective distance zone 602 corresponds to a distance threshold that can be compared to the distance 404.

As shown in FIG. 6, the location or contact point of the user input is moved so as to be external to the adjustment zone 502 (e.g., upwards into a distance zone 602). The slider alteration module 208 detects the second user interaction 604 based on a movement that defines the distance 404. More specifically, the distance 404 results from a movement of the interaction implement 126 from one position as represented by the interaction implement 126A (e.g., the finger depicted with a dotted outline) to another position as represented by the interaction implement 126B. The second user interaction 604 includes the interaction implement 126 being dragged out of the adjustment zone 502 and into a distance zone 602. In the illustrated example, the interaction implement 126B moves a detected distance 404 and reaches the second distance zone 602-2. Generally, each distance zone 602 of the multiple distance zones 602-1 to 602-4 respectively matches a different range of distances dependent on respective heights of the distance zones. Further, each distance zone 602 of the multiple distance zones 602-1 to 602-4 respectively corresponds to a different precision level 132 of multiple different precision levels 132. An example of a distance zone-to-precision level correspondence is described with reference to FIG. 7.

Figure 7:
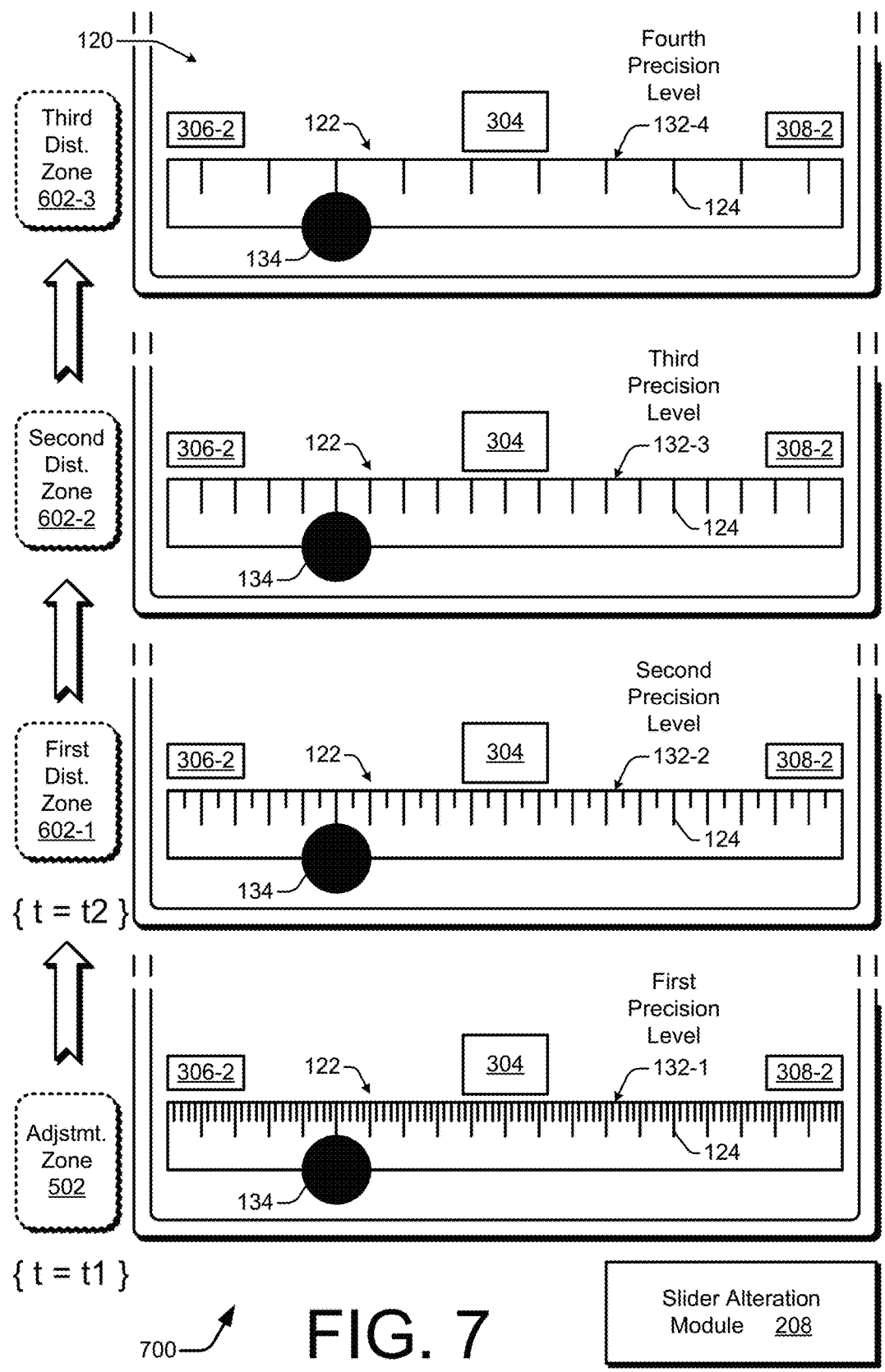
FIG. 7 illustrates an example user interface in which a slider alteration module enables multiple different precision levels to be activated for a slider based on multiple different distances of a user interaction from the slider.

FIG. 7 illustrates generally at 700 multiple examples of the user interface 120 at a second time "t2" when a slider alteration module 208 enables activation of multiple different precision levels 132 for the slider 122. These different precision levels 132 are activated based on different distances 404 traversed away from the slider 122 by a user input. Individual ones of multiple different zones 502 and 602 (of FIGS. 5 and 6) respectively correspond to individual ones of multiple different precision levels 132. As shown, the adjustment zone 502 corresponds to a first precision level 132-1. Further, the first, second, and third distance zones 602-1, 602-2, and 602-3 respectively correspond to second, third, and fourth precision levels 132-2, 132-3, and 132-4.

The first precision level 132-1 of the slider 122 at the first time "t1" is lower than the second precision level 132-2 at the second time "t2." Similarly, the second precision level 132-2 that corresponds to the first distance zone 602-1 is lower than the third precision level 132-3 that corresponds to the second distance zone 602-2. Generally, the slider alteration module 208 increases the corresponding precision level 132 as the second user interaction is detected at locations at increasingly greater distances 404 from the slider 122. The slider alteration module 208 increases the corresponding precision level 132 by decreasing a granularity of the displayed values 124 or by widening the separation space 128 between adjacent values 124.

A number of different examples are described for this distance-based triggering mechanism. Each example is described in the context of the following scenario: Consider a situation in which the slider alteration module 208 establishes multiple distance zones 602 as shown in FIG. 6. A second user interaction 604 can be detected at any distance 404 from the slider 122. In this scenario, the user input moves into the second distance zone 602-2. In response to detecting this distance 404 from the slider 122, the slider alteration module 208 switches the slider 122 to the third precision level 132-3 as shown in FIG. 7.

In a first example of the distance-based triggering mechanism, further adjustments to the values 124 can occur while the user input remains within the second distance zone 602-2. If the slider adjustment module 206 detects sideways movement 402 along the second distance zone 602-2, the slider adjustment module 206 updates the indicated value 304 based on the granularity of the values 124 displayed at the third precision level 132-3. Additional "vertical" movement to a different distance 404 can further alter the precision level 132. Thus, if progress along the available displayed values 124 is too slow at the third precision level 132-3 (or if a desired value 124 has been bumped off the slider 122 at the third precision level 132-3), the contact location of the user interaction can be dropped down to a lower distance zone 602 that corresponds to a lower precision level 132. On the other hand, if a still higher precision level 132 is desired, the contact location of the user interaction can be moved to the third distance zone 602-3 that is still farther from the slider 122. Accordingly, the slider alteration module 208 can increase the precision of the slider 122 to the fourth precision level 132-4 responsive to the greater distance 404. These adjustments and alterations can continue until a desired value 124 is selected or the user input is disengaged from the user interface 120 (e.g., until a finger is removed from a touch-sensitive surface).

In a second example of the distance-based triggering mechanism, and in contrast with the first one, further adjustments to the values 124 can occur after the contact location of the user input returns to the adjustment zone 502. In other words, for the indicated value 304 to change in accordance with the third precision level 132-2, the slider adjustment module 206 seeks again to detect movement 404 of the user input along the slider 122. Another second user interaction 604 to a different distance zone 602, such as the third distance zone 602-3, can alter the precision level 132 again. Additionally, a movement in the opposite direction (e.g., below the slider 122) can reset the current precision level 132 to the first precision level 132-1. Alternatively, if the slider interaction module 118 detects that the user input is no longer engaged with the user interface 120 (e.g., because the end user 104 has lifted a finger from a touch-sensitive display screen), the slider interaction module 118 resets the slider 122 to a default or lowest precision level 132.

Additionally, in some other example implementations, the slider 122 can be implemented like a rotatable wheel in which a portion of the full available range of values 124 is displayed while other values 124 are not visible. The non-visible values 124 are effectively part of the wheel, but they are "hidden" at one or both ends of the displayed slider 122. To reach the non-displayed values 124, an end user moves a contact location for user input near an endpoint of the slider 122. In response, the slider interaction module 118 shifts values 124 that are "hidden" at that endpoint onto the displayed portion of the slider 122. In this manner, the slider interaction module 118 can enable access to a desired value from the values 124 that are displayed at a higher precision level 132, even if an updated display range 302 does not initially include the desired value in the visible range. Various implementations for the operation or display of sliders 122 are described separately above. However, such implementations or aspects thereof may be combined in other implementations. Further, although the implementations presented above are described with respect to a distance-based triggering mechanism, the implementations may alternatively be applied with a speed-based triggering mechanism. Such a speed-based triggering mechanism is described with reference to FIG. 8.

Figure 8:
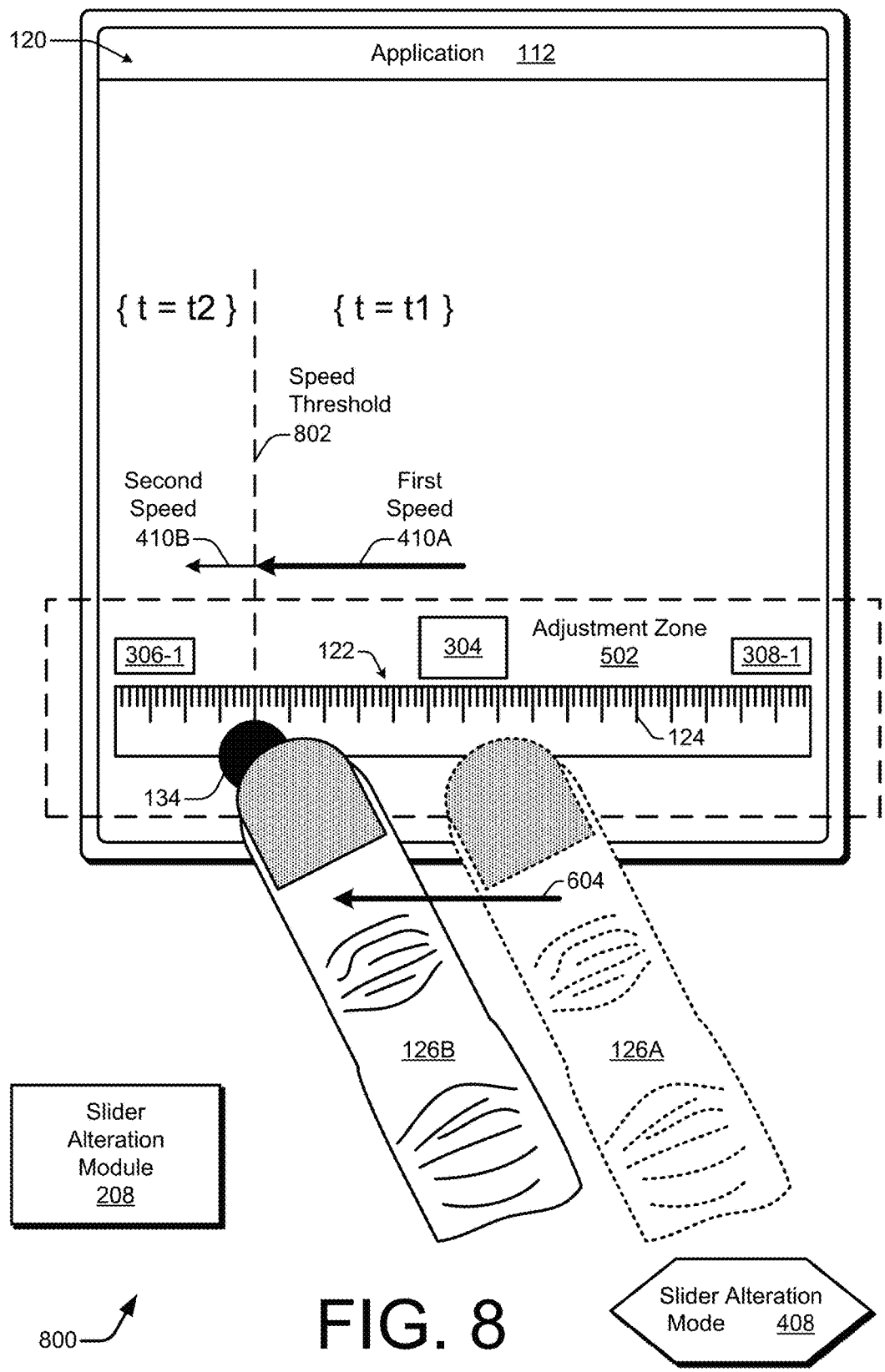
FIG. 8 illustrates an example user interface in which a slider alteration module alters a precision level of a slider based on a speed of movement of a user interaction.

FIG. 8 illustrates generally at 800 an example user interface 120 in which a slider alteration module 208 alters a precision level of the slider 122 based on a speed 410 of a second user interaction 604. Thus, a precision level alteration is triggered responsive to a change in the speed 410 of a movement of a user input, such as that of the interaction implement 126. As shown, a first speed 410A and a second speed 410B are depicted. In an example scenario, an end user initially moves the interaction implement 126 at a fast speed to quickly approach a desired value 124. The end user then slows the speed of the interaction implement 126 as part of the second user interaction 604 to attempt to select the exact desired value 124. Here, this selection can be made efficiently by displaying the slider 122 at a second time "t2" (e.g., as shown in FIG. 3 or 7) with an increased precision level 132.

In an example operation, the first speed 410A corresponds to the interaction implement 126A (e.g., a finger depicted with a dotted outline) at a first time "t1," and the second speed 410B corresponds to the interaction implement 126B at a second time "t2." After the speed of the interaction implement 126 slows from the first speed 410A, the speed eventually reaches the second speed 410B. The second speed 410B comports with a speed threshold 802, such as by being less than the speed threshold 802. The speed threshold 802 can be implemented as an absolute speed in terms of millimeters or pixels, a relative speed in terms of a physical length of the slider 122 (e.g., one-tenth of the width of a displayed slider per half second), a speed that is dependent on an initial or fastest speed 410 (e.g., half of a fasted initial speed), and so forth. Alternatively, the speed threshold 802 can be dependent on a rate of change of the speed 410, or a detected deceleration of the interaction implement 126.

The slider alteration module 208 can determine the speed 410 based on a time difference or delta that elapses while the interaction implement 126 moves between two points. The two points can correspond to a physical distance on a display that is traversed during the time delta, to two different pixel coordinates at the beginning and the end of the time delta, to two different values 124 at the beginning and the end of the time delta, and so forth. For an example approach using the displayed values 124 for determining the speed 410, the following variables are employed: a first timestamp "T1," a second timestamp "T2," a first slider value "SV1" at the first timestamp T1, and a second slider value "SV2" at the second timestamp T2. The speed "S" of the marker 134 at the second timestamp T2 is then computed using the following formula: $S=(SV2-SV1)/(T2-T1)$.

One speed threshold 802 is explicitly depicted in FIG. 8 and described above. However, multiple speed thresholds 802 can be implemented. For example, the slider alteration module 208 can utilize three increasingly lower speed thresholds. As the slider alteration module 208 detects that the speed 410 of the interaction implement 126 crosses each speed threshold, the slider alteration module 208 can alter the slider 122 to have an increasingly higher precision level 132. Thus, multiple speed thresholds 802 that respectively correspond to multiple precision levels 132 can be implemented analogously to the multiple distance zones 602 that respectively correspond to the multiple precision levels 132, which are shown in FIG. 7.

Having discussed example details of systems, techniques, and schemes for slider manipulation with precision alteration, consider now some example procedures to illustrate additional aspects of the techniques.

Example Procedures

Figure 9:
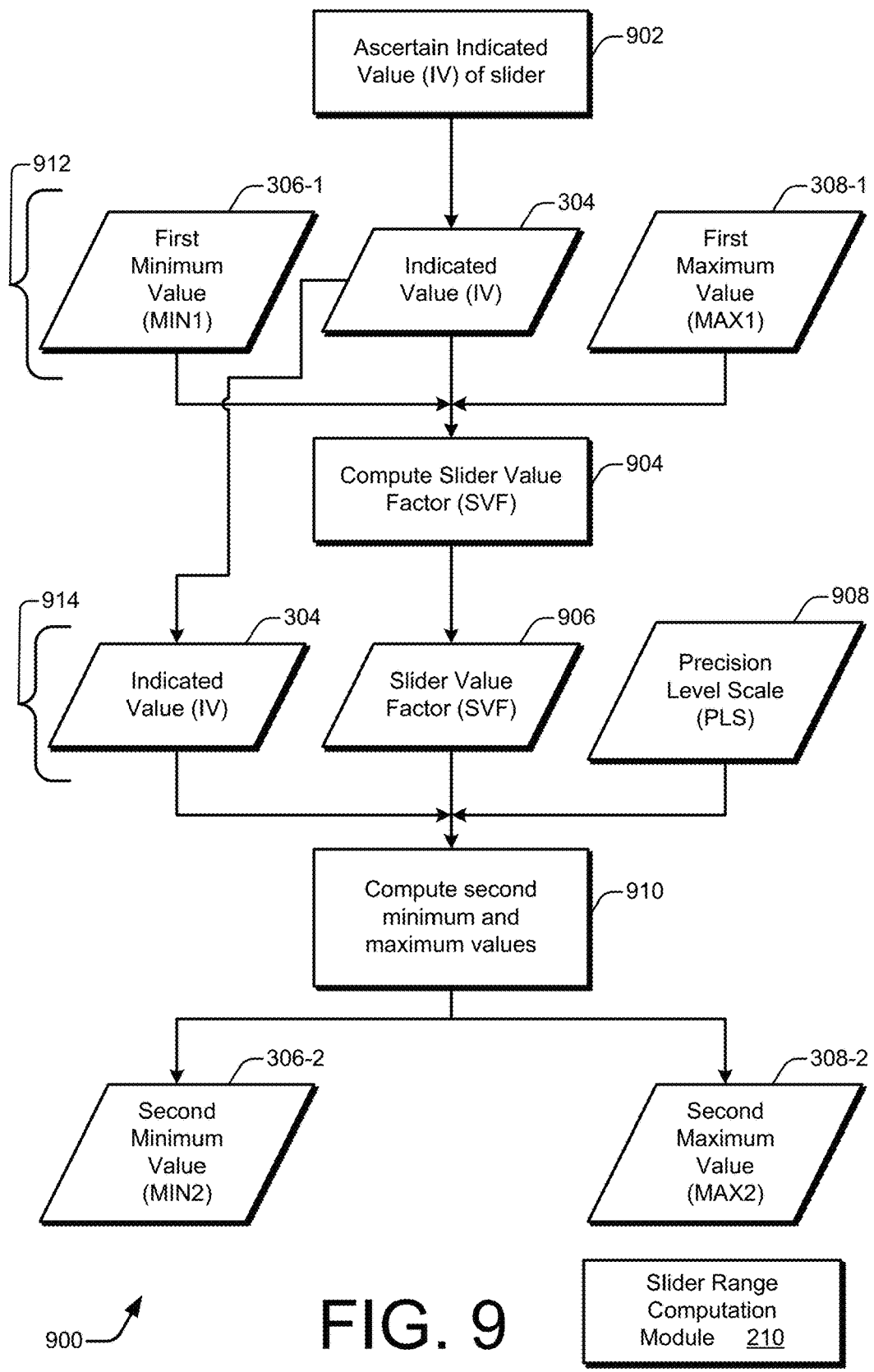
FIG. 9 is a flowchart illustrating an example procedure by a slider range computation module for computing updated minimum and maximum values for a slider having an altered precision level.
Figure 10:
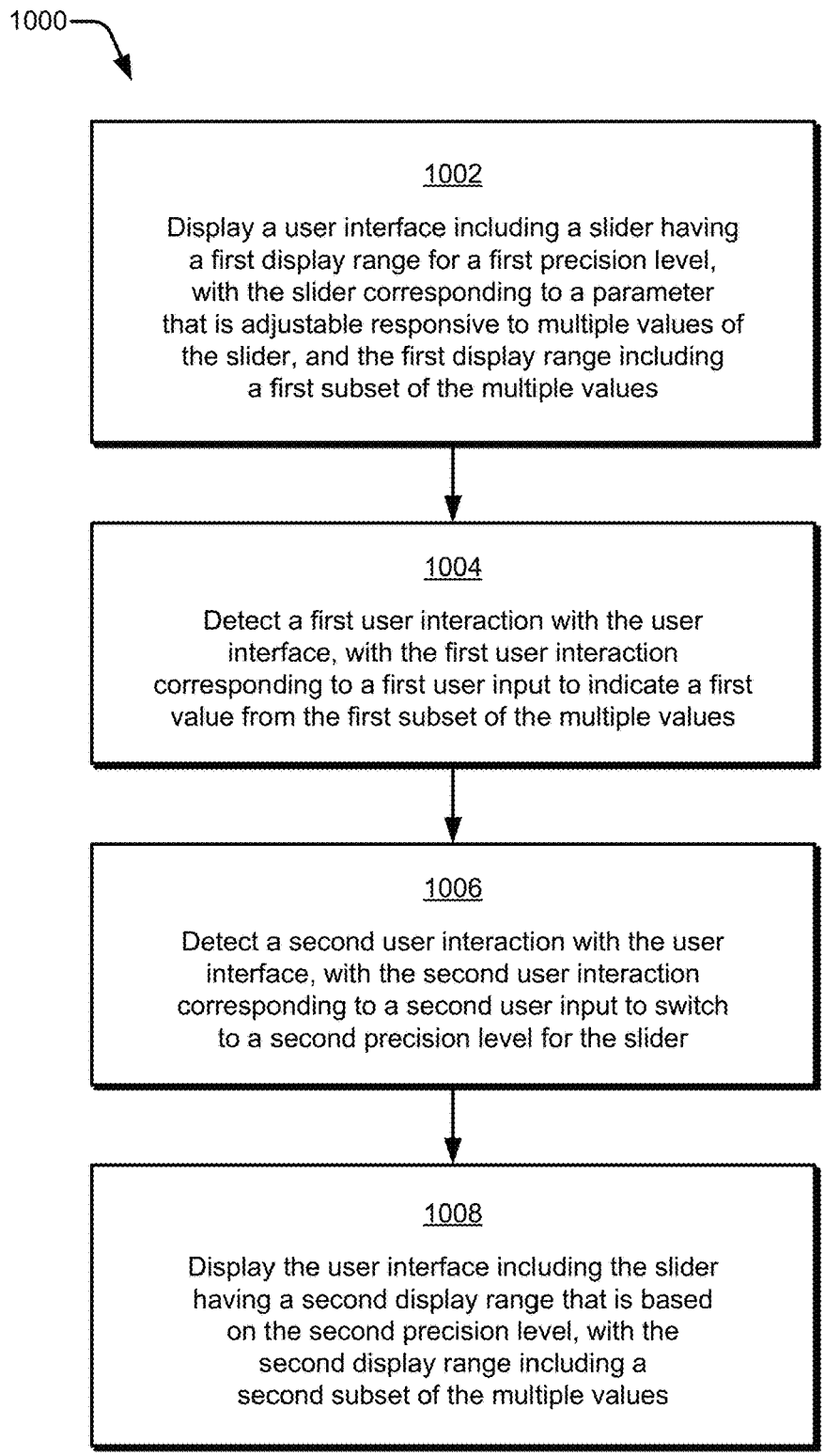
FIG. 10 is a flow diagram illustrating an example procedure in accordance with one or more example implementations.
Figure 11:
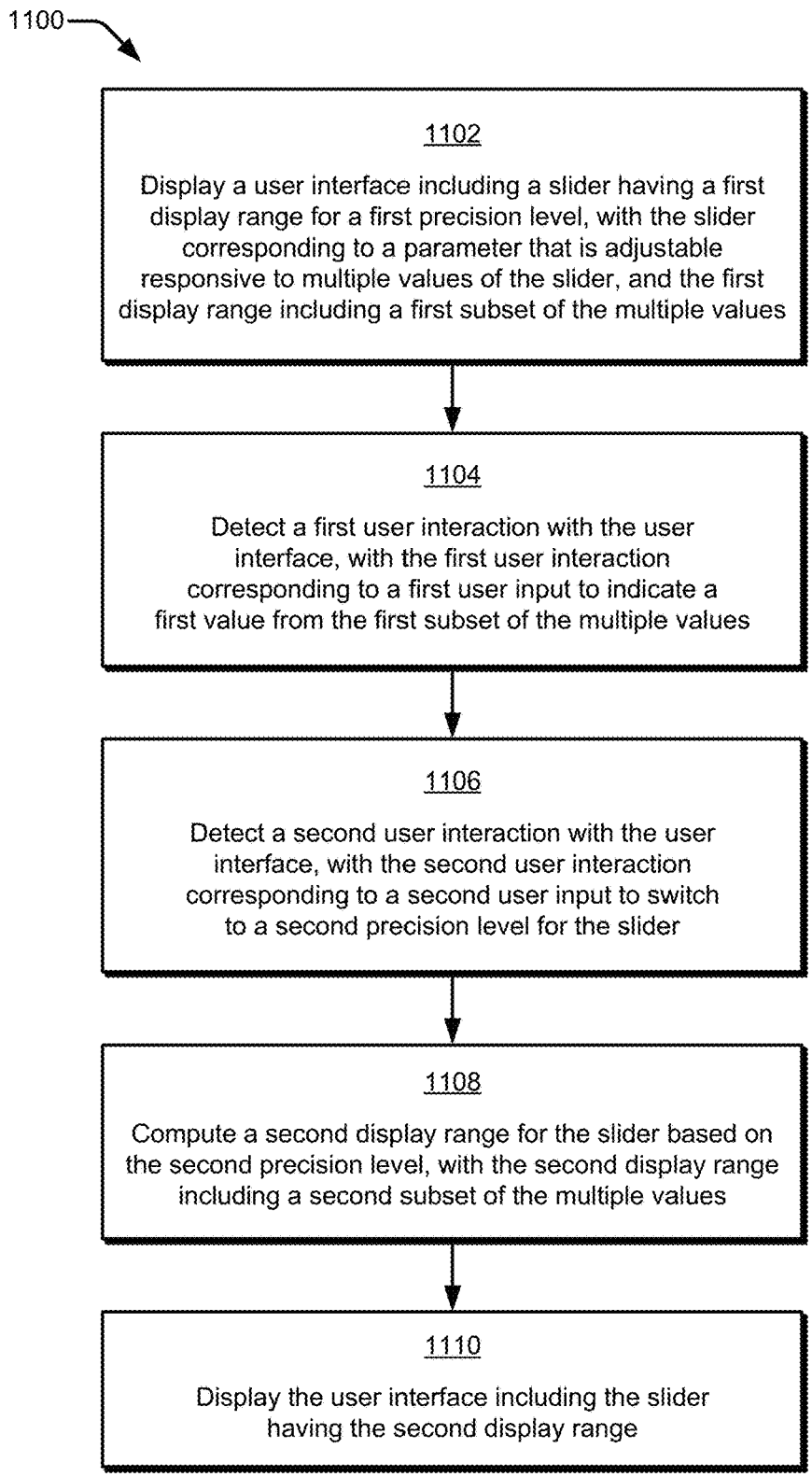
FIG. 11 is another flow diagram illustrating another example procedure in accordance with one or more example implementations.

This section describes with reference to FIGS. 9-11 example procedures in one or more implementations for slider manipulation with precision alteration. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as a computing device 102 (of FIG. 1) or a computing device 1202 (of FIG. 12), that includes a slider interaction module 118 (e.g., of FIGS. 1, 2, and 12).

FIG. 9 is a flowchart illustrating an example procedure 900 performed by a slider range computation module 210. For the procedure 900, the slider range computation module 210 computes updated minimum and maximum values 306-2 and 308-2 for a slider having an altered precision level 132. At block 902, an indicated value (IV) of a slider is ascertained. For example, for the slider 122 at the first time "t1," the slider adjustment module 206 can ascertain the value 124 that is currently pointed to by the marker 134 as the indicated value 304 (IV), which is included as part of a row 912. The slider range computation module 210 obtains the indicated value 304 (IV), the first minimum value 306-1 (MIN1), and the first maximum value 308-1 (MAX1), as shown at the row 912. Based on these three values, a slider value factor (SVF) is computed at block 904. The slider value factor (SVF) accounts for the current indicated value 304 (IV) such that the updated display range can be established without having to change the indicated value 304 (IV) or the current location of the marker. For example, the slider range computation module 210 can compute the slider value factor 906 (SVF) using the following formula: $SVF=(MAX1-MIN1)/(IV-MIN1)$.

The slider range computation module 210 therefore has access to both the indicated value (IV) 304 and the slider value factor 906 (SVF), as shown at a row 914. The slider range computation module 210 also obtains a precision level scale 908 (PLS). The precision level scale 908 (PLS) represents a number of the subset of values 124 that are to be included in a display range 302 after the precision alteration. For example, if a current display range 302 is one hundred (100) values 124, and an updated display range 302 is twenty-five (25) values 124, the precision level scale 908 (PLS) is 25.

At block 910, second minimum and maximum values are computed. The second minimum and maximum values are computed for the slider 122 at the second time "t2" so as to have an increased second precision level 132-2. For example, the slider range computation module 210 can compute the second minimum and maximum values based on the indicated value 304 (ISV), the slider value factor 906 (SVF), and the precision level scale 908 (PLS), as shown at the row 914. Specifically, the slider range computation module 210 can compute the second minimum value 306-2 (MIN2) and the second maximum value 308-2 (MAX2). These second values can be computed using the following formulas: $MIN2=IV-(SVF*PLS)$; and $MAX2=IV+(1-SVF)*PLS$. For the second time "t2," the slider 122 is assigned the second minimum value 306-2 (MIN2) and the second maximum value 308-2 (MAX2) to realize the second precision level 132-2. During the precision-level alteration, the currently-indicated value 304 (IV) can remain unchanged, and the marker 134 can be unmoved, even with the precision level 132 being switched to a different precision. However, the marker 134 can be moved again if the contact location of the user input is moved further after the slider 122 is displayed with the second precision level 132-2.

FIG. 10 is a flow diagram that includes four blocks 1002-1008 and that illustrates an example procedure 1000 for slider manipulation with precision alteration in accordance with one or more example implementations. At block 1002, a user interface including a slider having a first display range for a first precision level is displayed, with the slider corresponding to a parameter that is adjustable responsive to multiple values of the slider—with the first display range including a first subset of the multiple values. For example, at least one computing device can display a user interface 120 including a slider 122 having a first display range 302-1 for a first precision level 132-1, with the slider 122 corresponding to a parameter 312 that is adjustable responsive to multiple values 124 of the slider 122. The first display range 302-1 includes a first subset of the multiple values 124.

At block 1004, a first user interaction with the user interface is detected, with the first user interaction corresponding to a first user input to indicate a first value from the first subset of the multiple values. For example, the computing device can detect a first user interaction with the user interface 120 (e.g., a sliding of a marker 134 along the slider 122), with the first user interaction corresponding to a first user input to indicate a first value 124 from the first subset of the multiple values 124. To do so, a slider adjustment module 206 may detect a movement 402 of a marker 134 that is interpreted during a slider adjustment mode 406 as a user input to change a currently-selected value 304.

At block 1006, a second user interaction with the user interface is detected, with the second user interaction corresponding to a second user input to switch to a second precision level for the slider. For example, the computing device can detect a second user interaction 604 with the user interface 120, with the second user interaction 604 corresponding to a second user input to switch to a second precision level 132-2 for the slider 122. For instance, a slider alteration module 208 may detect a change in location or speed of a contact point for a user input (e.g., that is made by an interaction implement 126). The change in location or speed is interpreted during a slider alteration mode 408 as a user input to trigger a switch from the first precision level 132-1 to the second precision level 132-2.

At block 1008, the user interface including the slider having a second display range that is based on the second precision level is displayed, with the second display range including a second subset of the multiple values. For example, the computing device can display the user interface 120 including the slider 122 having a second display range 302-2 that is based on the second precision level 132-2, with the second display range 302-2 including a second subset of the multiple values 124. With the second subset being smaller than the first subset, the second display range 302-2 can be smaller than the first display range 302-1.

FIG. 11 is a flow diagram that includes five blocks 1102-1110 and that illustrates an example procedure 1100 for slider manipulation with precision alteration in accordance with one or more example implementations. At block 1102, a user interface including a slider having a first display range for a first precision level is displayed, with the slider corresponding to a parameter that is adjustable responsive to multiple values of the slider—the first display range including a first subset of the multiple values. For example, a user interface display module 202 of at least one computing device can display a user interface 120 including a slider 122 having a first display range 302-1, with the slider 122 corresponding to a parameter 312 that is adjustable responsive to multiple values 124 of the slider 122. The first display range 302-1 includes a first subset of the multiple values 124.

At block 1104, a first user interaction with the user interface is detected, with the first user interaction corresponding to a first user input to indicate a first value from the first subset of the multiple values. For example, the computing device can detect a first user interaction with the user interface 120 responsive to a first movement 402 of an interaction implement 126, such as a finger or a stylus. The first user interaction corresponds to a first user input to indicate a first value 304 from the first subset of the multiple values 124 that are displayed at a first time "t1." For instance, a slider adjustment module 206 may detect that an end user 104 is moving a finger in a path along a slider bar of the slider 122 to slide a marker 134 over different values 124. The sliding corresponds to an end-user command to indicate different particular values 124 that are pointed to by the marker 134 as the marker 134 is dragged along the slider 122.

At block 1106, a second user interaction with the user interface is detected, with the second user interaction corresponding to a second user input to switch to a second precision level for the slider. For example, the computing device can detect a second user interaction 604 with the user interface 120 responsive to a change in position or speed of the interaction implement 126. The second user interaction 604 corresponds to a second user input to switch to a second precision level 132-2 for the slider 122 due to a position beyond the slider 122 or a speed 410 below a speed threshold 802. More specifically, a slider alteration module 208 may detect that the finger of the end user 104 has glided above an adjustment zone 502 that at least partially overlaps the slider 122 or that the finger has slowed to a predetermined speed. Such detected actions are interpreted as an end-user command to increase a precision level 132 of the slider 122 by displaying fewer values 124.

At block 1108, a second display range for the slider is computed based on the second precision level, with the second display range including a second subset of the multiple values. For example, the computing device can compute a second display range 302-2 for the slider 122 based on the second precision level 132-2, with the second display range 302-2 including a second subset of the multiple values 124 of the parameter 312. To increase the precision level 132, the second subset of values 124 is smaller in number than the first subset of values 124. A slider range computation module 210 may therefore compute a second minimum value 306-2 and a second maximum value 308-2 based on a currently-indicated value 124 (e.g., an indicated value 304) and a total number of values 124 to be included in the second display range 302-2 (e.g., a precision level scale 908 (PLS) of FIG. 9).

At block 1110, the user interface including the slider having the second display range is displayed. For example, the computing device can display the user interface 120 including the slider 122 having the second display range 302-2 at a second time "t2." After the user interface display module 202 presents the slider 122 having the second display range 302-2, the slider adjustment module 206 can detect further movement 402 along the slider 122 or along a distance zone 602 to facilitate a selection of a particular value 124 at a finer precision level.

Having described example procedures in accordance with one or more implementations, consider now an example system and device that can be utilized to implement the various schemes and techniques described herein.

Example System and Device

Figure 12:
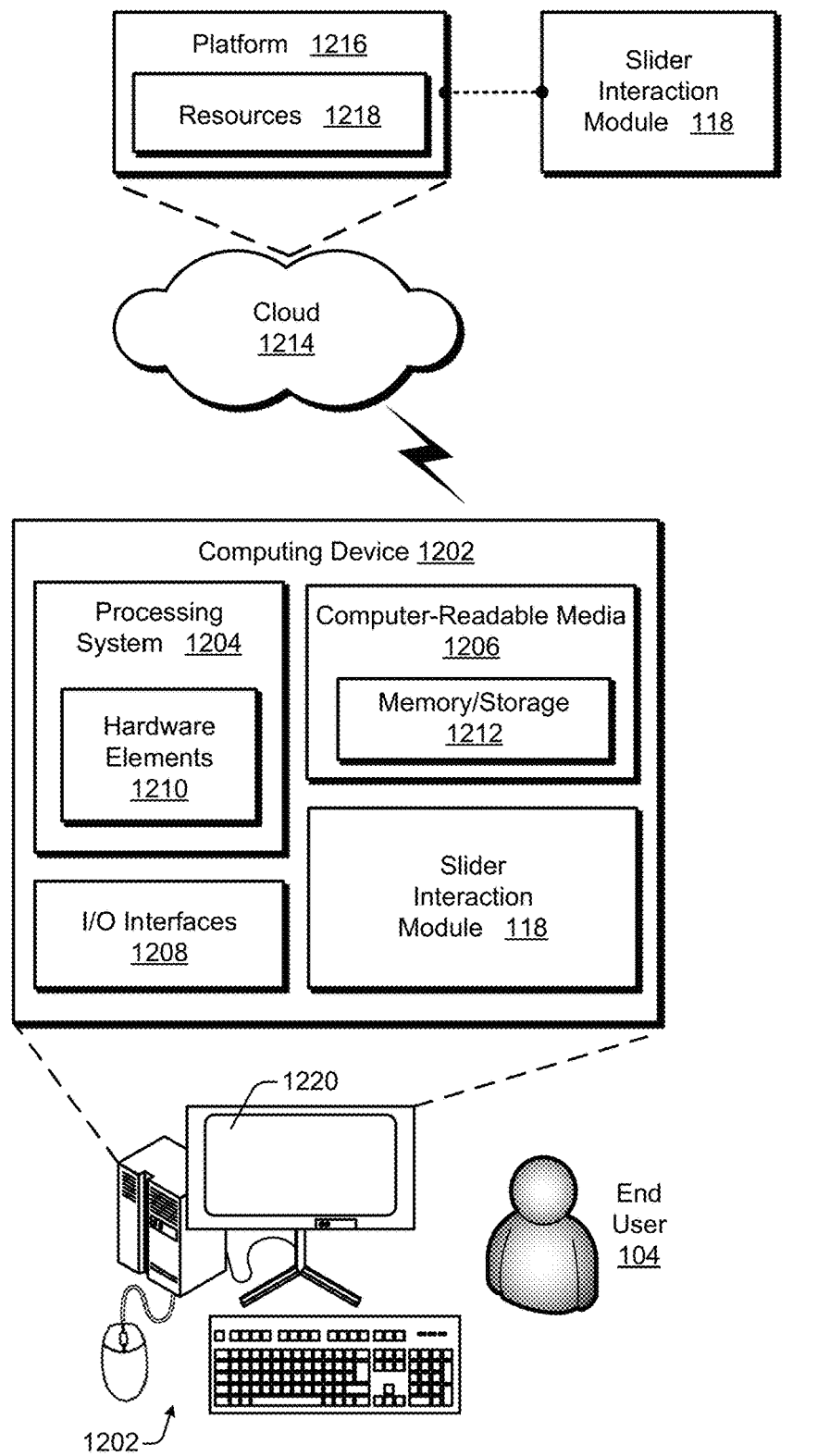
FIG. 12 illustrates an example system including various components of example computing devices that can implement slider manipulation with precision alteration.

FIG. 12 illustrates generally at 1200 an example system including an example computing device 1202 representative of one or more computing systems or computing devices that may implement the various techniques described herein. This is depicted through the inclusion of a slider interaction module 118, which may operate as described herein above. A computing device 1202 may be implemented as, for example, a computing device 102 (e.g., of FIG. 1) in an independent or standalone mode. The computing device 1202 can execute an application or operating system that is capable of detecting user input representative of movement, user input representative of a contact location with respect to aspects of a displayed user interface, or other user interactions with a user interface, including one that is presented on a display screen 1220. Generally, a computing device 1202 may be implemented as, for example, an end user device (e.g., a smart phone or desktop computer) of an end user 104, a corporate device (e.g., a server side device or data center hardware) of a business, an on-chip system or systemon-a-chip (SOC) (e.g., that is integrated with a tablet device or a display device), or any other suitable computing device or computing system.

In an example implementation as also shown in FIG. 1, the slider interaction module 118 is executing at one location (e.g., within a housing of the end-user computing device 102). However, the slider interaction module 118 can alternatively be executing in the cloud (e.g., on a server or network-side computing device) to remotely provide a user interface on an end-user computing device, and such an example cloud-based implementation is also shown in FIG. 12. Alternatively, a portion of the slider interaction module 118 can be executing at both a client-side computing device and a server-side computing device. In such an implementation, the operations implemented by the slider interaction module 118 as described herein may be distributed across a client-server architecture.

The example computing device 1202 as illustrated includes at least one processing system 1204, one or more computer-readable media 1206, and one or more I/O interfaces 1208 that may be communicatively coupled, one to another. Although not explicitly shown, the computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including one or more hardware elements 1210 that may be implemented as processors, functional blocks, and so forth. This may include implementation in hardware as an application specific integrated circuit (ASIC), a general-purpose processor, or other logic device formed using e.g. one or more semiconductors. The hardware elements 1210 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (e.g., random access memory (RAM)) or nonvolatile media (e.g., read only memory (ROM), flash memory, optical discs, or magnetic disks). The memory/storage component 1212 may include fixed media (e.g., RAM, ROM, or a fixed hard drive) or removable media (e.g., a flash memory card, a removable hard drive, or an optical disc). The computer-readable media 1206 may be implemented in a variety of other ways as further described below.

The input/output interface(s) 1208 are representative of functionality to allow a user to enter commands or information to computing device 1202 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1202 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An implementation of the described modules, and techniques thereof, may be stored on or transmitted across some form of computer-readable media. The computer-readable media 1206 may include a variety of media that may be accessed by the computing device 1202. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1202, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1210 or computer-readable media 1206 may be representative of modules, programmable device logic, fixed device logic, a combination thereof, and so forth that are implemented in a hardware form that may be employed in some implementations to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer readable storage media or by one or more hardware elements 1210. The computing device 1202 may be configured to implement particular instructions or functions corresponding to software or hardware modules. Accordingly, implementation of a module that is executable by the computing device 1202 as software may be achieved at least partially in hardware, e.g., through use of computer-readable storage media or the hardware elements 1210 of the processing system 1204. The instructions or functions may be executable/operable by one or more articles of manufacture (e.g., one or more computing devices 1202 or processing systems 1204) to implement techniques, modules, or examples described herein.

The techniques described herein may be supported by various configurations of the computing device 1202 and are not limited to the specific aspects of the example devices described herein. This functionality may also be implemented fully or partially through use of a distributed system, such as over a "cloud" 1214 via a platform 1216 as described below.

The cloud 1214 may include or represent a platform 1216 for resources 1218. The platform 1216 abstracts underlying functionality of hardware (e.g., one or more servers or at least one data center) and software resources of the cloud 1214. The resources 1218 may include applications or data that can be utilized while computer processing is at least partially executed on servers remote from, or distributed around, the computing device 1202. Resources 1218 may also include services provided over the Internet or through a subscriber network, such as a cellular or Wi-Fi network.

The platform 1216 may abstract resources and functions to connect the computing device 1202 with other computing devices or services. The platform 1216 may also serve to abstract a scaling of resources to provide a corresponding level of scale to encountered demand for the resources 1218 implemented via the platform 1216. Accordingly, in an interconnected device implementation, implementation of functionality described herein may be distributed throughout the illustrated system of FIG. 12, or at least throughout the cloud 1214 along with the computing device 1202. For example, functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. At least one computing device operative in a digital medium environment, the at least one computing device including a processing system and at least one computer-readable storage medium, the at least one computing device comprising:
   a user interface display module to display a user interface including a slider having a first precision level of a plurality of precision levels with a first granularity of values;
   a slider adjustment module to detect a first user interaction within an adjustment zone that overlaps the slider;
   a slider alteration module to detect a second user interaction that includes a distance from the slider to a contact location within a distance zone of a plurality of distance zones, each of the plurality of distance zones external to the adjustment zone and each of the plurality of distance zones corresponding to a precision level of the plurality of precision levels, the slider alteration module to alter the slider to have a second precision level of the plurality of precision levels with a second granularity of values based on the second user interaction,
   wherein the user interface display module is further to display the user interface including the slider having the second precision level with the second granularity of values.

2. The at least one computing device of claim 1, wherein:
   the slider adjustment module is to detect an additional user interaction and the additional user interaction corresponds to a change of speed between the second user interaction and the additional user interaction.

3. The at least one computing device of claim 1, wherein:
   the first granularity of values corresponds to a first separation space between a first set of adjacent values of the slider;
   the second granularity of values corresponds to a second separation space between a second set of adjacent values of the slider; and
   the second separation space is greater than the first separation space.

4. The at least one computing device of claim 1, wherein the slider is a vertical slider.

5. The at least one computing device of claim 1, wherein the slider is a horizontal slider.

6. The at least one computing device of claim 1, wherein the slider alteration module establishes the plurality of distance zones as part of a slider alteration mode.

7. The at least one computing device of claim 1, wherein:
   the first precision level for the slider corresponds to a first number of pixels per value of a first display range;
   the second precision level for the slider corresponds to a second number of pixels per value of a second display range; and
   the first number is smaller than the second number.

8. The at least one computing device of claim 1, wherein the first user interaction comprises a path along the slider.

9. In a digital medium environment, at least one computer-readable storage medium storing processor-executable instructions that, responsive to execution by a processing system, cause at least one computing device to perform operations comprising:

displaying a user interface including a slider having a first display range for a first precision level of a plurality of precision levels, the slider corresponding to a parameter that is adjustable responsive to multiple values of the slider, the first display range including a first subset of the multiple values;

detecting a first user interaction with the user interface in an adjustment zone that overlaps the slider, the first user interaction corresponding to a first user input to indicate a first value from the first subset of the multiple values;

detecting a second user interaction with the user interface that includes a distance from the slider to a contact location within a distance zone of a plurality of distance zones, each of the plurality of distance zones external to the adjustment zone and each of the plurality of distance zones corresponding to a precision level of the plurality of precision levels, the second user interaction corresponding to a second user input to switch to a second precision level of the plurality of precision levels for the slider;

computing a second display range for the slider based on the second precision level, the second display range including a second subset of the multiple values; and displaying the user interface including the slider having the second display range.

10. The at least one computer-readable storage medium of claim 9, wherein the first user interaction and the second user interaction comprise a continuous user interaction with the user interface.

11. The at least one computer-readable storage medium of claim 10, wherein the continuous user interaction with the user interface comprises a continuous touch, from the first user interaction to the second user interaction, of a physical display screen that displays the user interface.

12. The at least one computer-readable storage medium of claim 9, wherein:

the first precision level for the slider corresponds to a first number of pixels per value of the first display range;

the second precision level for the slider corresponds to a second number of pixels per value of the second display range; and the first number is smaller than the second number.

13. The at least one computer-readable storage medium of claim 9, wherein:

the first user interaction comprises a path along the slider.

14. The at least one computer-readable storage medium of claim 9, wherein:

the first user interaction comprises a path along the slider; and the second user interaction comprises a speed of a movement.

15. The at least one computer-readable storage medium of claim 14, wherein the detecting the second user interaction with the user interface comprises detecting that the speed of the movement comports with at least one speed threshold.

16. In a digital medium environment, a method implemented by at least one computing device, the method comprising:

displaying, by the at least one computing device, a user interface including a slider having a first display range for a first precision level of a plurality of precision levels, the slider corresponding to a parameter that is adjustable responsive to multiple values of the slider, the first display range including a first subset of the multiple values;

detecting, by the at least one computing device, a first user interaction within an adjustment zone that overlaps the slider, the first user interaction corresponding to a first user input to indicate a first value from the first subset of the multiple values;

a step for detecting a second user interaction that includes a distance from the slider to a contact location within a distance zone of a plurality of distance zones, each of the plurality of distance zones external to the adjustment zone and each of the plurality of distance zones corresponding to a precision level of the plurality of precision levels, the second user interaction corresponding to a second user input to switch to a second precision level of the plurality of precision levels for the slider; and displaying, by the at least one computing device, the user interface including the slider having a second display range that is based on the second precision level, the second display range including a second subset of the multiple values.

17. The method of claim 16, wherein the step for detecting the second user interaction with the user interface comprises activating a slider alteration mode that enables a precision level of the slider to be altered.

18. The method of claim 17, wherein the step for detecting the second user interaction with the user interface comprises:

determining a speed that corresponds to the second user interaction; and a step for determining the second precision level for the slider based on the speed.

19. The method of claim 16, wherein the slider is a vertical slider.

20. The method of claim 16, wherein the slider is a horizontal slider.

* * * * *